United States Patent
Liu et al.

(10) Patent No.: US 7,222,648 B2
(45) Date of Patent: May 29, 2007

(54) BRACKET ASSEMBLY FOR MOBILE STAND

(75) Inventors: Chia-Sheng Liu, Chiayi County (TW); Chieh-Yuan Tsai, Taichung County (TW)

(73) Assignee: Durq Machinery Corp. (TW)

( * ) Notice: Subject to any disclaimer, the term of this patent is extended or adjusted under 35 U.S.C. 154(b) by 0 days.

(21) Appl. No.: 11/211,552

(22) Filed: Aug. 26, 2005

(65) Prior Publication Data
US 2006/0272744 A1    Dec. 7, 2006

(30) Foreign Application Priority Data
Jun. 6, 2005    (TW) .............................. 94209418 U

(51) Int. Cl.
*B25H 1/10* (2006.01)
*B25H 1/06* (2006.01)
*B25H 1/14* (2006.01)

(52) U.S. Cl. ..................................... 144/286.5; 144/287

(58) Field of Classification Search ................ 144/285, 144/286.1, 286.5, 287; 182/181.1, 183.1, 182/185.1, 186.1; 83/471, 477, 477.1, 477.2, 83/374, 375
See application file for complete search history.

(56) References Cited

U.S. PATENT DOCUMENTS

| | | | |
|---|---|---|---|
| 6,595,251 B2 * | 7/2003 | Ayala et al. ............. | 144/286.1 |
| 6,745,804 B2 * | 6/2004 | Welsh et al. ............... | 144/287 |
| 2004/0250903 A1 * | 12/2004 | Welsh ...................... | 144/286.5 |
| 2005/0006002 A1 * | 1/2005 | Barclay de Tolly ...... | 144/286.5 |

* cited by examiner

*Primary Examiner*—Shelley Self
(74) *Attorney, Agent, or Firm*—Bacon & Thomas PLLC

(57) ABSTRACT

For mounting on the beam of a mobile stand to hold a machine, a bracket assembly includes a bracket body supportable on the beam of the mobile stand, a front clamp mounted in the bracket body for clamping on the beam of the stand, a rear clamp pivoted to the bracket body, and a locking control device pivotally mounted in the bracket body for operation by the user to impart a biasing force to the rear clamp for enabling the rear clamp to be firmly clamped on the beam of the stand so as to further hold down the machine on the beam.

11 Claims, 9 Drawing Sheets

BRACKET ASSEMBLY FOR MOBILE STAND

BACKGROUND OF THE INVENTION

1. Field of the Invention

The present invention relates to a stand for supporting a machine and more particularly, to a bracket assembly for a mobile stand for supporting a machine.

2. Description of the Related Art

FIG. 1 shows a conventional mobile stand 1. The stand 1 comprises a beam 2, four legs 3, and two brackets 4. The legs 3 support the beam 2 in horizontal above a flat surface. The two brackets 4 are mounted on the beam 2 at the top to hold a machine such as a circular sawing machine (not shown). Referring to FIG. 2, the beam 2 has two protruding portions 2a and 2b longitudinally arranged in parallel at two sides. The bracket 4 comprises a rectangular body 4a, a front clamping plate 4b, a rear clamping plate 4c, and a spring member 4d. The bracket body 4a has a bottom opening 4e for receiving the beam 2. The front clamping plate 4b is pivoted to the bracket body 4a and attached to one protruding portion 2a of the beam 2. The rear clamping plate 4c is pivoted to the bracket body 4a and attached to the other protruding portion 2b of the beam 2. The spring member 4d is fastened to the bracket body 4a and stopped against the rear clamping plate 4c to force the rear clamping plate 4c downwards.

FIG. 2 shows the front clamping plate 4b and the rear clamping plate 4c clamped on the two protruding portions 2a and 2b of the beam 2. At this time, the circular sawing machine for example is mounted on each bracket 4. When wishing to remove the circular sawing machine from the stand 1, the rear clamping plate 4c of each bracket 4 is turned upwards from the protruding portion 2b of the beam 2, and then the circular sawing machine with the two brackets 4 are removed from the beam 2.

In the aforesaid design, the spring member 4d imparts a downward pressure to the rear clamping plate 4c, holding the rear clamping plate 4c in engagement with the protruding portion 2b of the beam 2. However, the limited spring force of the spring member 4d is insufficient to hold down the bracket 4 on the beam 2 against an unexpected external biasing force, and the circular sawing machine may be forced out of place accidentally during working.

Therefore, it is desirable to provide a bracket assembly for mobile stand that eliminates the aforesaid drawbacks.

SUMMARY OF THE INVENTION

The present invention has been accomplished under the circumstances in view. It is the main objective of the present invention to provide a bracket assembly for a mobile stand, which holds the machine on the mobile stand firmly assuring high safety of work.

To achieve this objective of the present invention, a bracket assembly for a mobile stand having a long beam and a plurality of legs that support the long beam for supporting a machine is provided. The bracket assembly comprises a bracket body mountable on the long beam of the mobile stand. A front clamp is mounted in the bracket body and has a front stop face contactable with the long beam of the mobile stand. A rear clamp is pivoted to the bracket body and has a rear stop face contactable with the long beam of the mobile stand and a guide face opposite to the rear stop face. A locking control device has an eccentric member and a follower rotatably coupled to the eccentric member. The eccentric member is pivoted to the bracket body and has an operating handle extending out of the bracket body. The follower has a push face kept in contact with the guide face of the rear clamp.

DETAILED DESCRIPTION OF THE INVENTION

Figure 7:
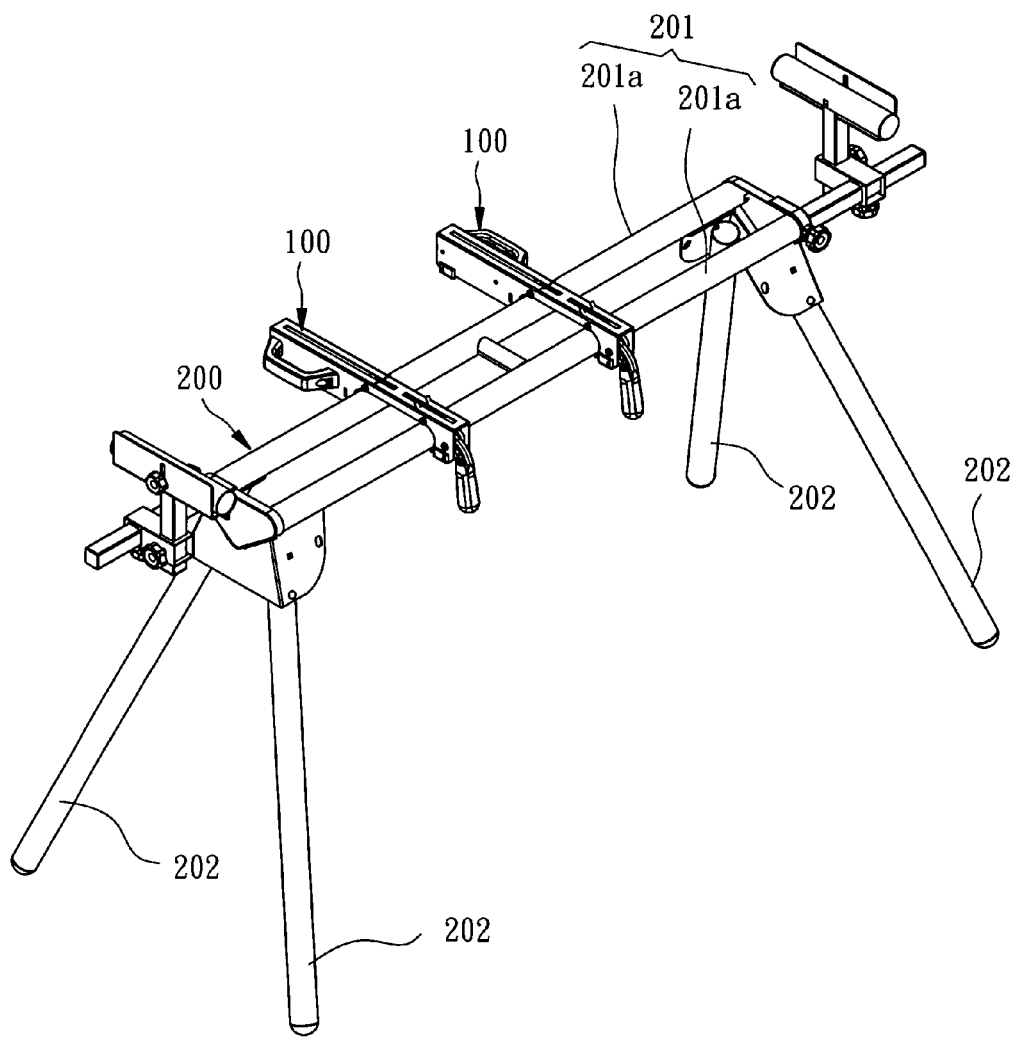
FIG. 7 shows two bracket assemblies fastened to the beam of the stand according to the present invention.
Figure 8:
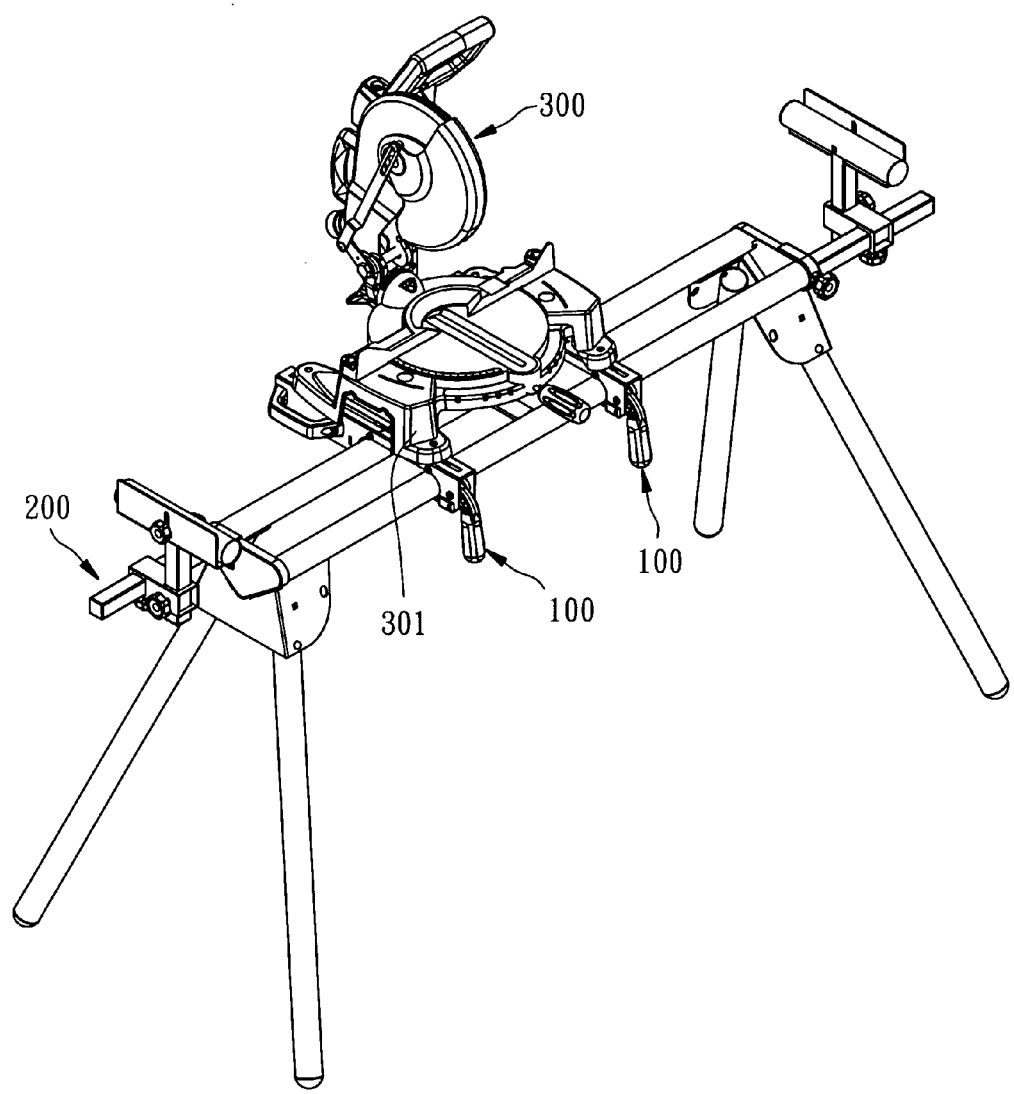
FIG. 8 corresponds to FIG. 7, showing a circular sawing machine supported on the two bracket assemblies.

FIG. 7 and show two bracket assemblies mounted on a mobile stand to hold a circular sawing machine. The stand, referenced by 200, comprises a long beam 201, and four legs 202 that support the beam 201 above the floor. The beam 201 is formed of two parallel round rods 201a. The two bracket assemblies, referenced by 100, are mounted on the top side of the beam 201 to hold a circular sawing machine 300, as shown in FIG. 8.

Figure 1:
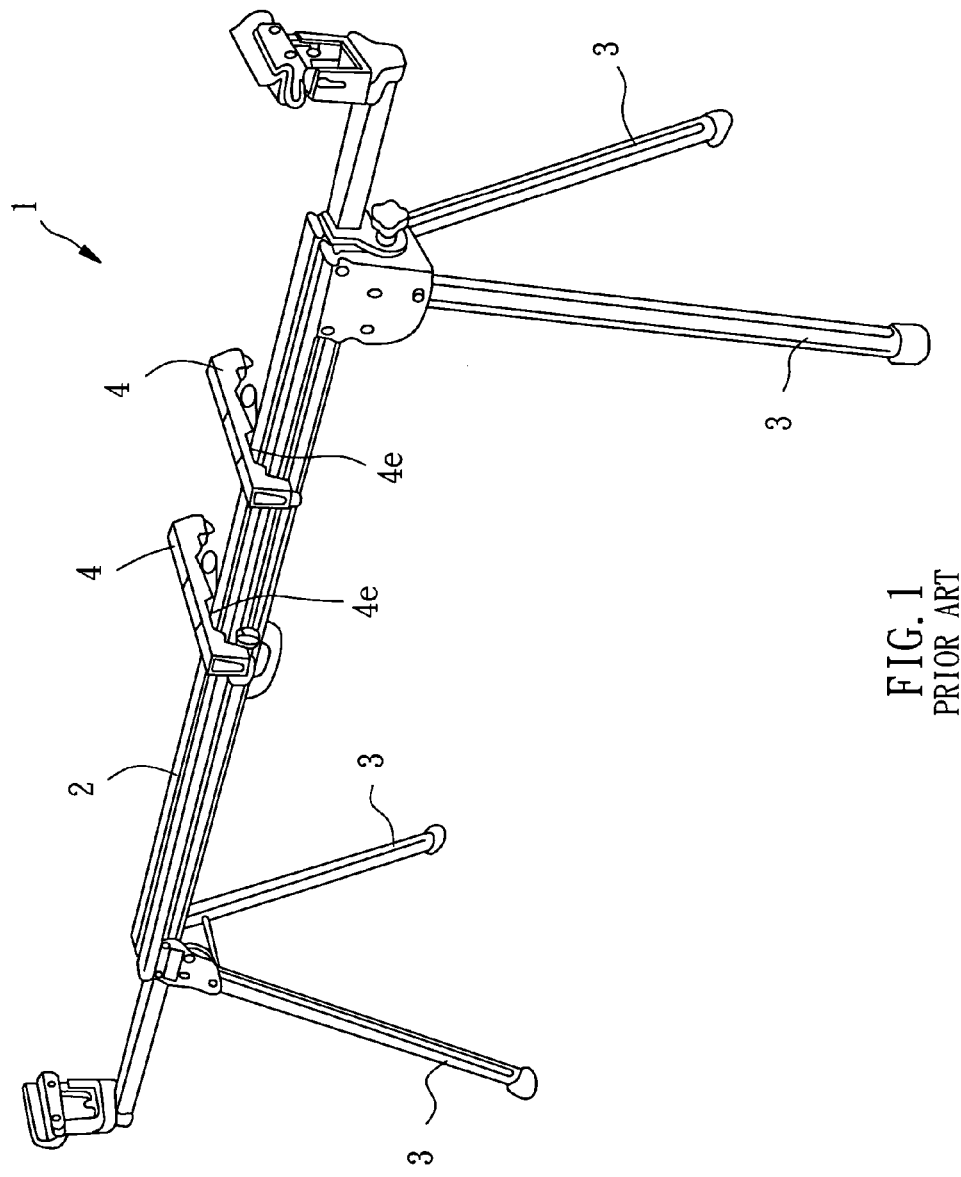
FIG. 1 is a perspective view showing two brackets fastened to a beam of a stand according to the prior art.
Figure 2:
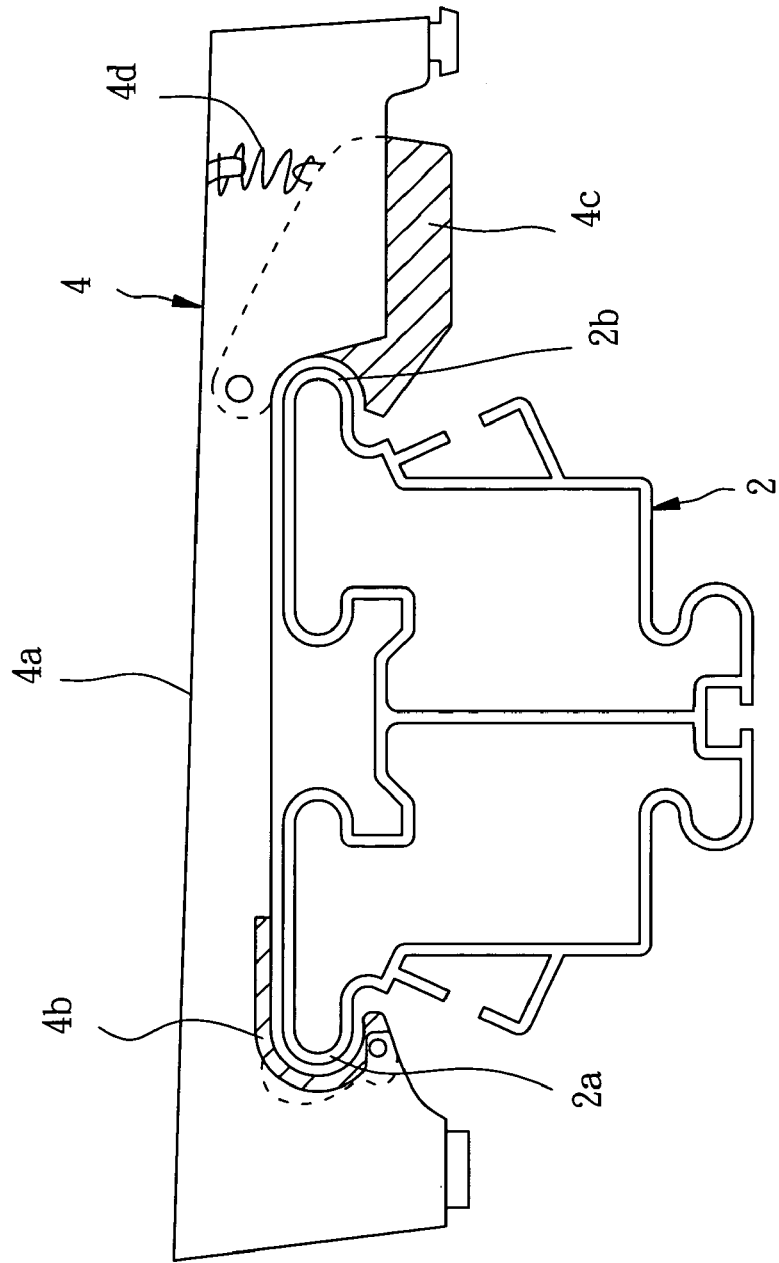
FIG. 2 is a schematic sectional view of a part of FIG. 1, showing the connection between the bracket and the beam.
Figure 3:
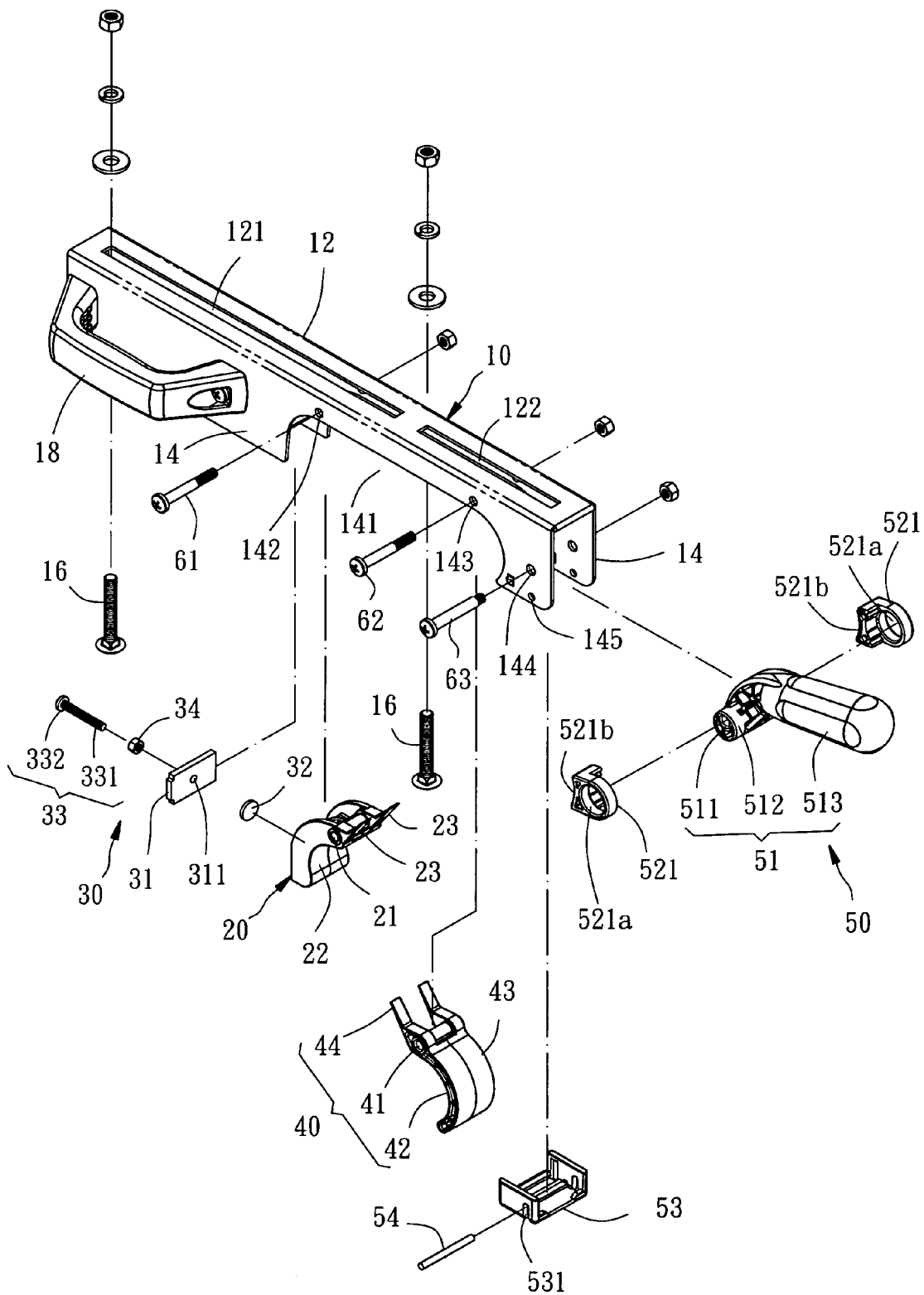
FIG. 3 is an exploded view of a bracket assembly according to the present invention.
Figure 4:
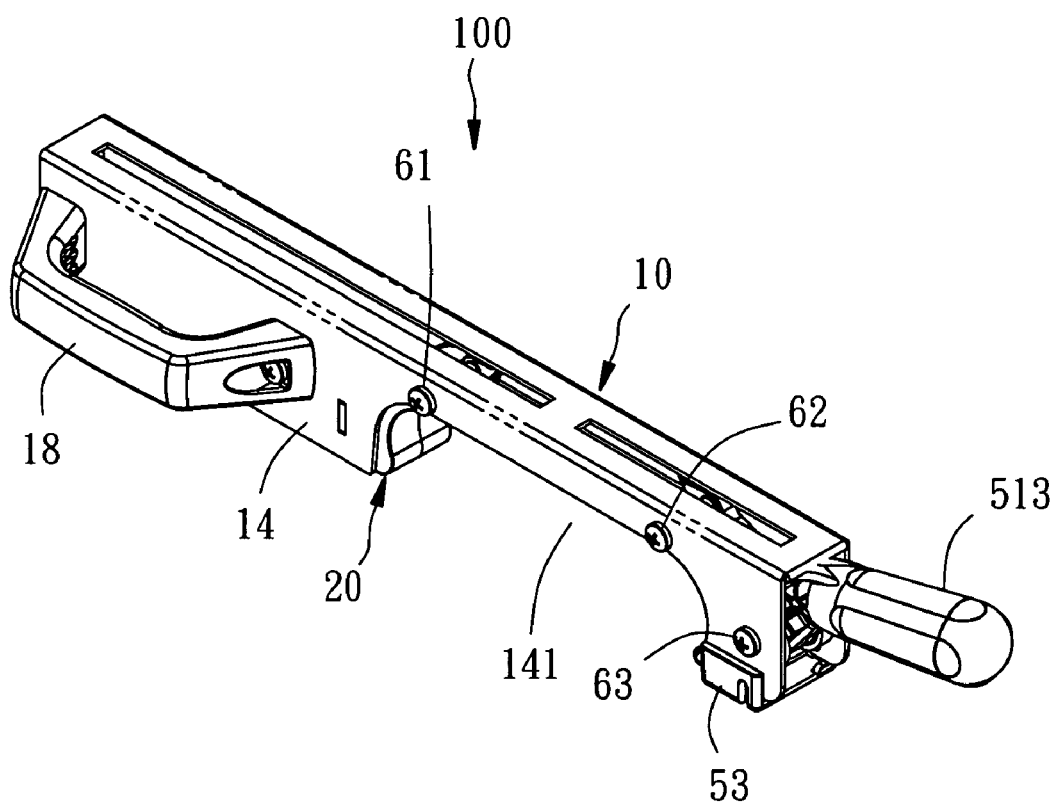
FIG. 4 is a perspective assembly view of the bracket assembly according to the present invention.
Figure 5:
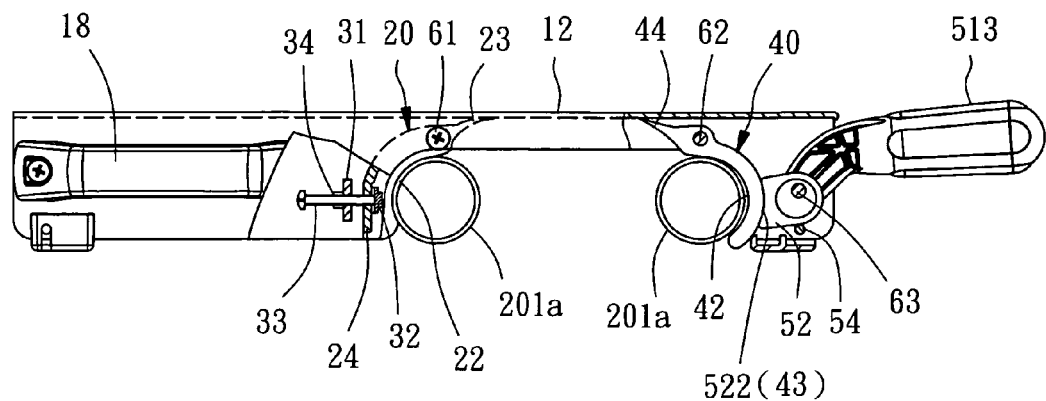
FIG. 5 is a sectional view of the present invention before pressing of the operating handle of the locking control device.

Referring to FIGS. 3–5, the bracket assembly 100 is comprised of a bracket body 10, a carrying handle 18, a front clamp 20, an adjustment device 30, a rear clamp 40, a locking control device 50, and three pivot pins 61–63.

The bracket body 10 comprises a horizontal top wall 12 and two vertical sidewalls 14. The horizontal top wall 12 has two longitudinal slots 121 and 122 through which screws 16 are inserted and threaded into the base 301 of the circular sawing machine 300 to affix the circular sawing machine 300 to the bracket body 10 (see FIG. 8). The vertical sidewalls 14 each have a bottom opening 141 deviated from the middle part for receiving the two round rods 201a (see FIG. 5), and a plurality of through holes, namely, the first through hole 142, the second through hole 143, the third through hole 144 and the fourth through hole 145. The carrying handle 18 is fixedly fastened to one vertical sidewall 14 at an outer side and remote from the bottom opening 141.

The front clamp 20 is an arched block, having a through hole 21, a front stop face 22, two protruding spring strips 23, and a backboard 24. During installation, the front clamp 20 is set in between the two vertical sidewalls 14, and then one pivot pin 61 is inserted through the two second through holes 142 of the bracket body 10 and the through hole 21 of the front clamp 20 to pivotally secure the front clamp 20 to the bracket body 10. At this time, the front stop face 22 faces the bottom openings 141 and the two protruding spring strips 23 are stopped against the bottom surface of the horizontal top wall 12. When fastening the bracket body 10 to the beam 201, the front stop face 22 of the front clamp 20 is forced into contact with the surface of one round rod 201a.

The adjustment device 30 is installed in the bracket body 10 and located between one end of the bracket body 10 and the front clamp 20. The adjustment device 30 comprises a locating plate 31, a stop block 32, a movable member 33, and a nut 34.

The locating plate 31 is fixedly connected between the two vertical sidewalls 14, having a through hole 311. The stop block 32 is set between the backboard 24 and the front stop face 22 of the front clamp 20. The movable member 33 comprises a threaded shank 331 and a head 332. The threaded shank 331 is inserted in proper order through the nut 34, a through hole 311 of the locating plate 31 and the backboard 24 and then fastened to the stop block 32. Therefore, when loosened the locknut 34, the movable member 33 can be moved forwards or backwards relative to the locating plate 31 to bias the front clamp 20 forwards or backwards. After adjustment, the locknut 34 is fastened tight again to lock the front clamp 20.

The rear clamp 40 is an arched clamping plate having a through hole 41, a rear stop face 42, a guide face 43, and two protruding spring strips 44. During installation, the rear clamp 40 is set in between the two vertical sidewalls 14, and then one pivot pin 62 is inserted through the two second through holes 143 of the bracket body 10 and the through hole 41 of the rear clamp 40 to pivotally secure the rear clamp 40 to the bracket body 10. At this time, the rear stop face 42 faces the bottom openings 141 opposite to the front stop face 22 of the front clamp 20; the guide face 43 is disposed opposite to the rear stop face 42; and the two protruding spring strips 44 are stopped against the bottom surface of the horizontal top wall 12 of the bracket body 10.

When fastening the bracket body 10 to the beam 201, the rear stop face 42 is kept in contact with the other round rod 201a. Further, in order to keep the circular sawing machine 300 in balance, the rear stop face 42 extends over the bottom side of the respective round rod 210a, i.e., much contact area is provided between the rear stop face 42 and the respective round rod 201a.

The locking control device 50 is installed in the bracket body 10 closer to the rear clamp 40. The locking control device 50 comprises an eccentric member 51, a follower 52, a back cover 53, and a locating pin 54.

The eccentric member 51 comprises an axle hole 511, a contacting portion 512, and an operating handle 513 outwardly extending from a middle part of the contacting portion 512.

The follower 52 comprises two coupling rings 521 and a push face 522. The coupling rings 521 are disposed at two sides relative to the operating handle 513, each having a center through hole 521a that receives the contacting portion 512, and a front surface 521b that forms a part of the push face 522. The push face 522 is an arched face matching the arched guide face 43 of the rear clamp 40. During installation, the pivot pin 63 is inserted through the two third through holes 144 of the bracket body 10 and the axle hole 511 of the eccentric member 51 to pivotally secure the eccentric member 51 to the bracket body 10, allowing the follower 52 to be synchronously moved with the eccentric member 51.

The back cover 53 is covered on the two vertical sidewalls 14 of the bracket body 10, having a mounting hole 531. The locating pin 54 is inserted through the mounting hole 531 of the back cover 53 and the two fourth through holes 145 of the bracket body 10 to affix the back cover 53 to the two sidewalls 14 of the bracket body 10. The back cover 53 reinforces the structural strength of the bracket body 10. The locating pin 54 is adapted to support the operating handle 513 when the operating handle 513 is pressed downwards.

The structural features of the bracket assembly 100 have been well described above. FIG. 5 shows the bracket body 10 attached to the two round rods 201a, the operating handle 513 kept in the released position, and the follower 52 giving no pressure to the rear clamp 40. At this time, the front stop face 22 of the front clamp 20 and the rear stop face 42 of the rear clamp 40 are respectively kept in slight contact with the periphery of the two round rods 201a, therefore the user can move the bracket body 10 along the two round rods 201a to the desired location or even remove the bracket body 10 from the two round rods 201a.

Figure 6:
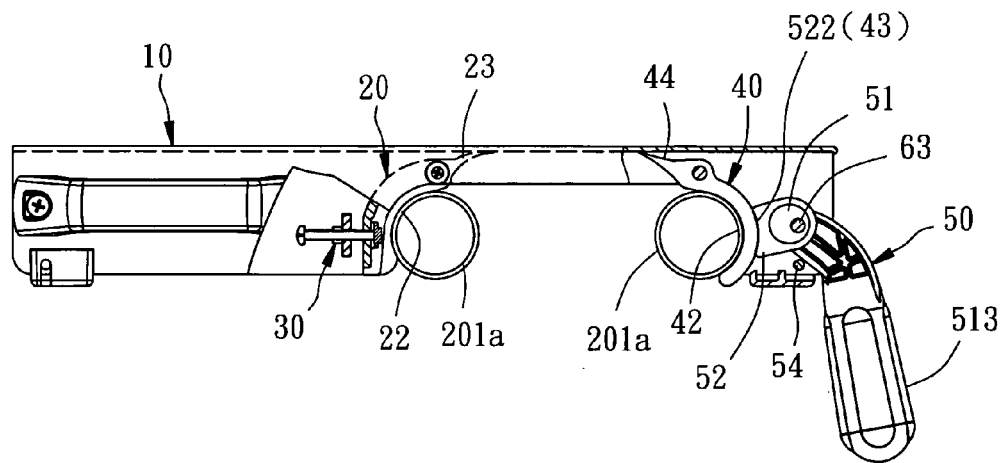
FIG. 6 is similar to FIG. 5 but showing the operating handle of the locking control device pressed down.

Referring to FIG. 6, the eccentric member 51 is turnable about the pivot pin 63. When the user pressed the operating handle 513 downwards to rotate the eccentric member 51, the follower 52 is driven by the eccentric member 51 to force the push face 522 against the guide face 43 of the rear clamp 40. At this time, the bracket body 10 is held down on the two round rods 201a by the front clamp 20 and the rear clamp 40 and the eccentric member 51, assuring high safety of work.

Figure 9:
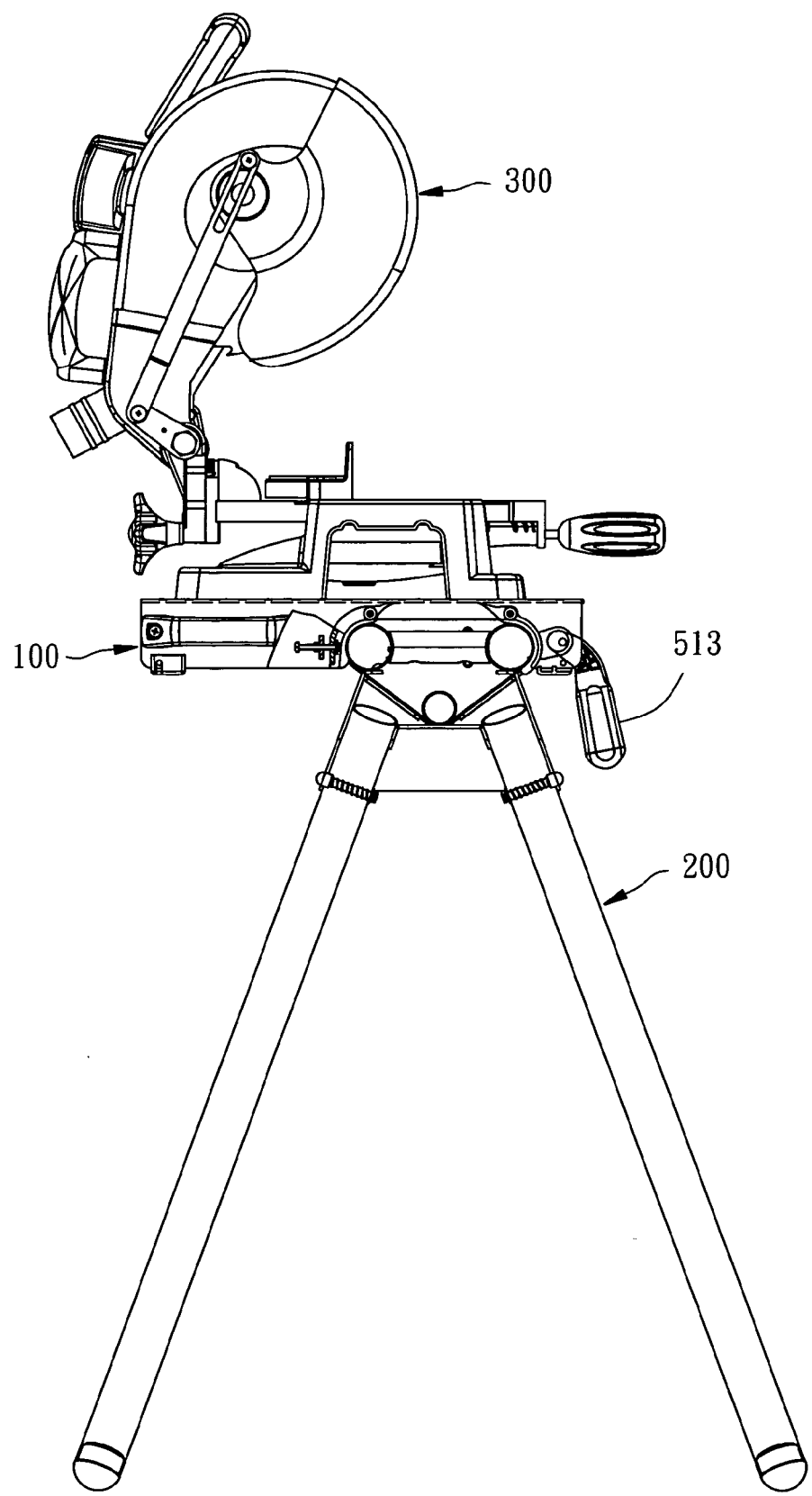
FIG. 9 is a side view of FIG. 8.

FIG. 7 shows two bracket assemblies 100 fastened to the beam 201 of the work table 200. FIGS. 8 and 9 show a circular sawing machine 300 supported on the two bracket assemblies 100.

Figure 10:
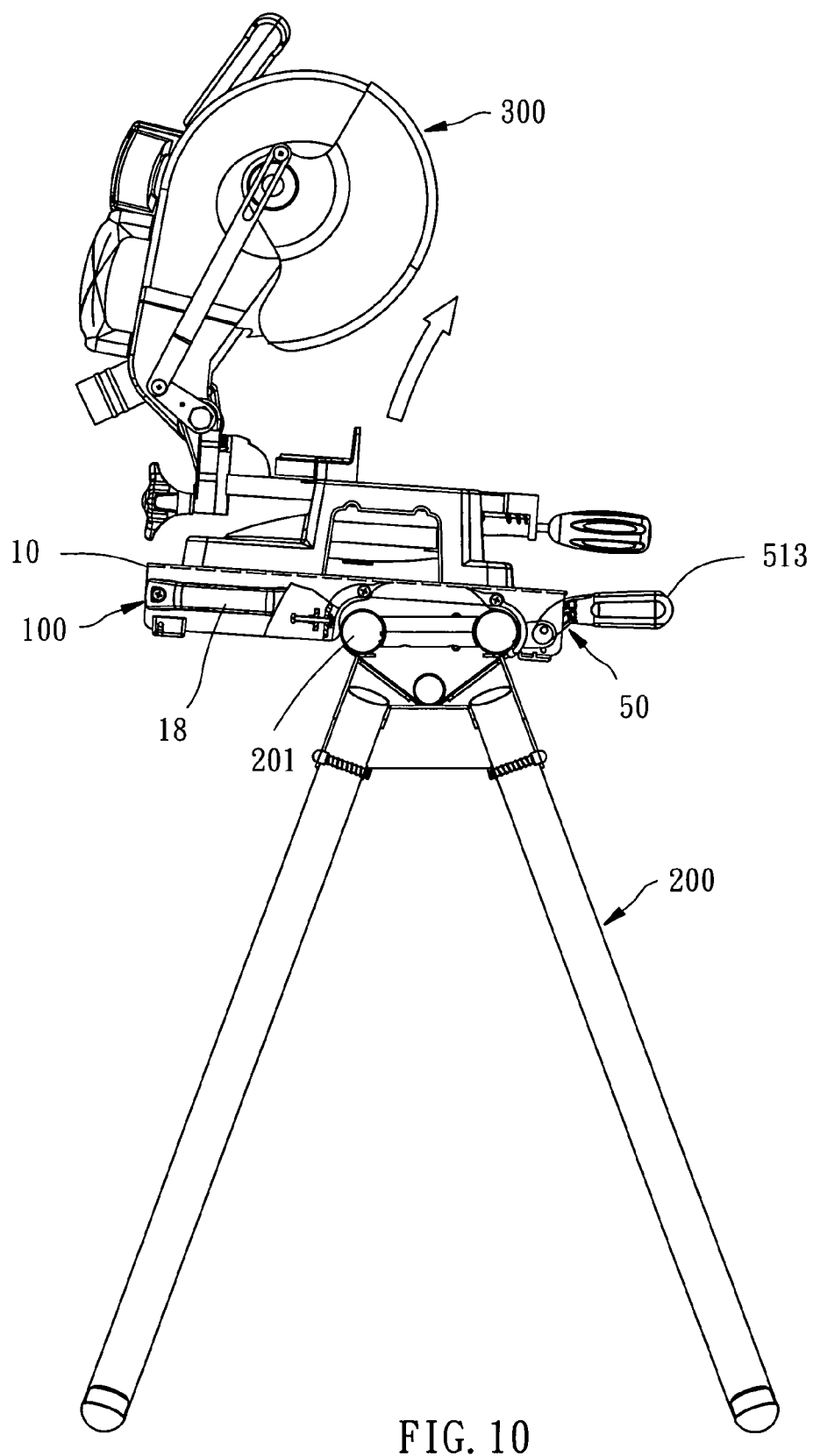
FIG. 10 corresponds to FIG. 9, showing removal of the circular sawing machine from the stand.

FIG. 10 is a schematic drawing showing removal of the circular sawing machine 300. Because the circular sawing machine 300 is heavier on the rear side, the invention has the carrying handle 18 set opposite to the locking device 50 for easy operation, and the bracket body 10 will be instantly separated from the beam 201 when lifting the circular sawing machine 300.

What is claimed is:

1. A bracket assembly for a mobile stand having a long beam and a plurality of legs that support the long beam for supporting a machine, said bracket assembly comprising:
    a bracket body mountable on the long beam of the mobile stand;
    a front clamp mounted in said bracket body, said front clamp having a front stop face contactable with the long beam of the mobile stand;
    a rear clamp pivoted to said bracket body and corresponding to said front clamp, said rear clamp having a rear stop face contactable with the long beam of the mobile stand, and a guide face opposite to said rear stop face; and
    a locking control device having an eccentric member and a follower rotatably coupled to said eccentric member, said eccentric member being pivoted to said bracket body and having an operating handle extending out of said bracket body, said follower having a push face kept in contact with said guide face of said rear clamp;
    wherein said eccentric member of said locking control device comprises a contacting portion; said operating handle extends outwards from a middle part of said contacting portion; said follower comprises two coupling rings respectively coupled to said contacting portion and set at two sides relative to said operating handle, said coupling rings each having a front side forming together said push face of said follower.

2. The bracket assembly as claimed in claim 1, wherein said guide face of said rear clamp is an arched face; said push face of said follower is an arched face matching said guide face.

3. A bracket assembly for a mobile stand having a long beam and a plurality of legs that support the long beam for supporting a machine, said bracket assembly comprising:
- a bracket body mountable on the long beam of the mobile stand;
- a front clamp mounted in said bracket body, said front clamp having a front stop face contactable with the long beam of the mobile stand;
- a rear clamp pivoted to said bracket body and corresponding to said front clamp, said rear clamp having a rear stop face contactable with the long beam of the mobile stand, and a guide face opposite to said rear stop face; and
- a locking control device having an eccentric member and a follower rotatably coupled to said eccentric member, said eccentric member being pivoted to said bracket body and having an operating handle extending out of said bracket body, said follower having a push face kept in contact with said guide face of said rear clamp;
- wherein said bracket body comprises a horizontal top wall and two vertical sidewalls, said vertical sidewalls each having a bottom opening for coupling to the long beam of the stand; said front clamp and said rear clamp are respectively pivotally mounted between said two vertical sidewalls of said bracket body.

4. The bracket assembly as claimed in claim 3, further comprising an adjustment device mounted in said bracket body, said adjustment device comprising a movable member connected to said front clamp and movable relative to said bracket body to bias said front clamp.

5. The bracket assembly as claimed in claim 4, wherein said adjustment device further comprises a locating plate fixedly mounted in said bracket body between said two vertical sidewalls, said locating plate having a through hole for receiving said movable member, and a locknut for locking said movable member; said movable member comprising a threaded shank inserted through the through hole of said locating plate, threaded into said locknut and connected to said front clamp.

6. The bracket assembly as claimed in claim 3, wherein the bottom opening of each of said two vertical sidewalls is deviated from a part of the respective vertical sidewall near said locking control device.

7. The bracket assembly as claimed in claim 6, wherein the front stop face of said front clamp is an arched stop face matching an arched portion of the long beam of the stand; the rear stop face of said rear clamp is an arched stop face matching an arched portion of said long beam opposite to said front clamp and extending over a bottom side of the long beam of the stand.

8. The bracket assembly as claimed in claim 6, further comprising a carrying handle affixed to one vertical sidewall of said bracket body remote from the bottom opening of the respective vertical sidewall.

9. The bracket assembly as claimed in claim 3, wherein said front clamp comprises a protruding spring strip stopped against a bottom surface of the horizontal top wall of said bracket body.

10. The bracket assembly as claimed in claim 3, wherein said rear clamp comprises a protruding spring strip stopped against a bottom surface of the horizontal top wall of said bracket body.

11. The bracket assembly as claimed in claim 3, wherein said locking control device further comprises a locating pin transversely inserted through said two vertical sidewalls of said bracket body for stopping said operating handle.

* * * * *